US007296334B2

(12) United States Patent
Kamata et al.

(10) Patent No.: US 7,296,334 B2
(45) Date of Patent: Nov. 20, 2007

(54) METHOD AND DEVICE FOR MANUFACTURING WIRE HARNESS

(75) Inventors: Takeshi Kamata, Shizuoka (JP); Kiyoshi Yagi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/487,226

(22) PCT Filed: Aug. 26, 2002

(86) PCT No.: PCT/JP02/08557

§ 371 (c)(1), (2), (4) Date: Sep. 15, 2004

(87) PCT Pub. No.: WO03/019580

PCT Pub. Date: Mar. 6, 2003

(65) Prior Publication Data

US 2005/0015966 A1 Jan. 27, 2005

(30) Foreign Application Priority Data

Aug. 27, 2001 (JP) ............................ 2001-256721

(51) Int. Cl.
*B23P 23/00* (2006.01)
*H01R 43/00* (2006.01)

(52) U.S. Cl. .................. 29/564.1; 29/564.2; 29/33 M; 29/854; 29/863

(58) Field of Classification Search ............... 29/564.1, 29/564.4, 564.6, 564.8, 566.2, 564.2, 33 M, 29/854, 857, 863
See application file for complete search history.

(56) References Cited

U.S. PATENT DOCUMENTS 4,126,935 A * 11/1978 Rhines et al. ................. 29/857
4,136,440 A * 1/1979 Brandewie et al. ........ 29/564.4
4,603,476 A * 8/1986 Tarbox ........................ 29/863
4,646,404 A * 3/1987 Matsui ...................... 29/564.4
5,052,449 A 10/1991 Fukuda et al.
5,127,159 A * 7/1992 Kudo et al. ............... 29/564.4
5,353,699 A 10/1994 Tamura
5,477,463 A * 12/1995 Tamura ..................... 29/564.4
5,606,795 A * 3/1997 Ohba et al. ................... 29/863
5,878,489 A * 3/1999 Shioda et al. .............. 29/564.6
6,169,934 B1 * 1/2001 Nakayama et al. ........ 29/564.1
6,195,884 B1 * 3/2001 Miyamoto et al. ............ 29/857
6,381,831 B1 * 5/2002 Suzuki ...................... 29/564.6
6,901,657 B2 * 6/2005 Takada ...................... 29/33 M

FOREIGN PATENT DOCUMENTS

| | | |
|---|---|---|
| DE | 12 99 336 B | 7/1969 |
| EP | 403115 A2 | 12/1990 |
| GB | 2 282 339 A | 4/1995 |
| JP | 61-245412 | 10/1986 |
| JP | 10-112229 | 4/1998 |

* cited by examiner

*Primary Examiner*—Dana Ross
(74) *Attorney, Agent, or Firm*—Kratz, Quintos & Hanson, LLP

(57) ABSTRACT

A wiring harness manufacturing method and a wiring harness manufacturing apparatus is provided, wherein manufacturing costs of a wiring harness is reduced. The wiring harness manufacturing apparatus (1) has a pair of wire stocking units (10*a*, 10*b*), a pair of cutting units (11*a*, 11*b*), a pair of joining units (12*a*, 12*b*), and a case insertion unit (13). Painting devices (14,15,16) are attached to one wire stocking unit (10*a*). Painting devices (17,18,19) are attached to one cutting unit (11*a*). Painting devices (18,19) are attached to one joining unit (12*a*). The painting devices (14,15,16,17,18,19) color the electric wire.

4 Claims, 12 Drawing Sheets

METHOD AND DEVICE FOR MANUFACTURING WIRE HARNESS

TECHNICAL FIELD

The present invention relates to a wiring harness manufacturing method and a wiring harness manufacturing apparatus for manufacturing a wiring harness arranged on a motor vehicle.

BACKGROUND ART

Various kinds of electronic equipment are carried on a motor vehicle. Therefore, the wiring harness is arranged on the motor vehicle so that electric power from a power source and control signals from a computer can be supplied to the electronic equipment. The wiring harness has electric wires and connectors attached to end portions of the electric wires.

The electric wire has a conductive core wire and an insulative covering portion covering the conductive core wire. The electric wire is a so-called covered or sheathed wire. The connector has a conductive terminal fitting and an insulative connector housing. The terminal fitting is attached to an end portion of the electric wire and is electrically-connected with the core wire of the electric wire. The connector housing is formed in a box-shape and accommodates the terminal fittings.

When the wiring harness is manufactured or assembled, the electric wire is firstly cut in a fixed length, and the terminal fitting is attached to the end portion of the electric wire. The electric wires are connected as the need arises. Subsequently, the terminal fitting is inserted into the connector housing. Like this, the above-described wiring harness is manufactured or assembled.

With regard to the electric wire of the wiring harness, the thickness of the core wire, material (for example, from view point of heat-resistance) of the covering portion, and service conditions should be distinguished. Here, the service conditions mean systems such as an air-bag system, an antilock brake system, and a power transmission system in which the electric wires are used.

The electric wires of the wiring harness are variously colored and marked for distinguishing the above systems. When the prior art wiring harness is manufactured, the above coloring and marking are carried out in a process of manufacturing the electric wire by forming the core wire from conductive metal such as copper.

On the other hand, various demands arise from users for the motor vehicle. That is, the motor vehicle is expected to have various kinds of electronic equipment. Consequently, the wiring harness sometimes consists of not less than 100 of the electric wires. Therefore, a factory to manufacture or assemble the wiring harness has to stock not less than 100 of electric wires, while making the stock control of the electric wires having each article number. And therefore, the cost for stocking the electric wires tends to increase.

Further, for example, the electric wire with a determined article number needs to be set in a device to cut off the electric wire in a fixed length. However, since there exists a lot of article numbers of the electric wires, a mistake in the article number of the electric wire would arise. Therefore, the yield of the wiring harness is reduced, thereby causing reduction of the productive efficiency of the wiring harness.

In order to solve such problems, the applicant of the present invention has suggested a wiring harness manufacturing method described in Japanese Patent Application Laid-open No.61-245412. In this wiring harness manufacturing method, the electric wires are colored and marked just before each of the wire manufacturing step, the cutting step, the cover removing step, the terminal-crimping step, and the case insertion step.

With respect to the above prior art wiring harness manufacturing method of Japanese Patent Application Laid-open No.61-245412, however, the coloring and the marking are carried out just before each of the steps of manufacturing or assembling the wiring harness as above.

Therefore, in the wiring harness manufacturing method of Japanese Patent Application Laid-open No.61-245412, a device for coloring and marking the electric wire has to be provided on each of a wire cutting unit, a covering portion removing unit, a terminal crimping unit, and a terminal inserting unit. The prior art wiring harness manufacturing method also requires installation or mounting work of the above coloring and marking device between each two units, and requires the wiring harness to be set on each coloring and marking device.

Like this, in the wiring harness manufacturing method of Japanese Patent Application Laid-open No.61-245412, the number of the coloring and marking device increases, which therefore increases the space for manufacturing the wiring harness.

And also, the coloring and marking work totally requires long time, which lowers the productive efficiency of the wiring harness. Like this, the wiring harness manufacturing method of Japanese Patent Application Laid-open No.61-245412 requires high manufacturing costs of the wiring harness.

In view of the foregoing, an object of the present invention is to provide a wiring harness manufacturing method and a wiring harness manufacturing apparatus, wherein the above drawbacks of the prior art wiring harness manufacturing method and apparatus have been solved and therefore manufacturing costs of the wiring harness can be reduced.

DISCLOSURE OF THE INVENTION

In the present invention, a wiring harness manufacturing method for assembling a wiring harness having electric wires and connectors attached to the electric wires comprises the steps of: a wire stocking step to stock the electric wires; and a cutting step to cut an electric wire stocked in the wire stocking step in a desirable length and to attach a terminal fitting of the connector to the electric wire, wherein, an outer surface of the electric wire is colored in at least one of the wire stocking step and the cutting step.

Like this, the electric wire is colored in at least one of the wire stocking step and the cutting step. Like this, since the electric wire is not necessarily colored in all the steps, the device to color the electric wire needs not to be attached to all the units to carry out the wire stocking step and the cutting step.

And, because the electric wire is not necessarily colored in all the steps, all the electric wires need not to be conveyed to the devices to color the electric wire from the units to carry out the wire stocking step and the cutting step. Further, the electric wire is colored in a step for assembling the wiring harness. Therefore, the article number (the kind of color of the outer surface) of the electric wire stocked by the wire stocking units can be reduced.

In this specification, “to color the outer surface of the electric wire” means to color the outer surface of the covering portion of the electric wire with a colorant. The colorant is a liquid substance in which color material (organic substance for industry) is dissolved and dispersed in water or in other solvent. As the organic substance, there exists dyes and pigments (mostly organic substance and synthetic material). In the present specification, “colorant” means both paint and coloring liquid.

In the coloring liquid, the dye is dissolved or dispersed in the solvent. In the paint, the pigment is dispersed in the dispersion liquid. Therefore, when the outer surface of the covering portion is colored by the coloring liquid, the dye soaks into in the covering portion, and when the outer surface of the covering portion is colored by the paint, the pigment adheres to the outer surface without soaking into the covering portion. That is, "to color the outer surface of the covering portion of the electric wire" in the present specification means to dye the outer surface of the covering portion of the electric wire with the dye and also to paint the pigment on the outer surface of the covering portion of the electric wire.

And, the solvent and the dispersion liquid should have an affinity for synthetic resin forming the covering portion of the electric wire so that the dye securely soaks into the covering portion of the electric wire and the pigment securely adheres to the outer surface of the covering portion of the electric wire.

In the present invention, a wiring harness manufacturing method for assembling a wiring harness having electric wires and connectors attached to the electric wires comprises the steps of: a wire stocking step to stock the electric wires; and a cutting step to cut an electric wire stocked in the wire stocking step in a desirable length and to attach a terminal fitting of the connector to the electric wire, a joining step to connect the electric wires which have been cut in desirable lengthes by the cutting step and to which the respective terminal fittings have been attached, wherein, an outer surface of the electric wire is colored in both the wire stocking step and one of the cutting step and the joining step.

Like this, the electric wire is colored in at least one of the wire cutting step and the joining step. Like this, since the electric wire is not necessarily colored in all the steps, the device to color the electric wire needs not to be attached to all the units to carry out the wire cutting step and the joining step.

And, because the electric wire is not necessarily colored in all the steps, all the electric wires need not to be conveyed to the devices to color the electric wire from the units to carry out the wire stocking step, the cutting step, and the joining step. Further, the electric wire is colored in a step for assembling the wiring harness. Therefore, the article number (the kind of color of the outer surface) of the electric wire stocked by the wire stocking units can be reduced.

In the present invention, a wiring harness manufacturing apparatus for assembling a wiring harness having electric wires and connectors attached to the electric wires comprises: wire stocking units each to stock the electric wires; and cutting units each to cut the electric wires stocked in the wire stocking units in desirable lengthes and to attach terminal fittings of the connectors to the respective electric wires, wherein, a coloring means to color an outer surface of each of the electric wires is attached to one of the wire stocking units and the cutting units.

Like this, the coloring means to color the electric wire are attached to one of the wire stocking units and the cutting units. Like this, the coloring means need not to be provided on all the wire stocking units and the cutting units. And, the electric wire is colored by the coloring means in a step for assembling the wiring harness. Therefore, the article number (the kind of color of the outer surface) of the electric wire stocked by the wire stocking units can be reduced.

In the present invention, a wiring harness manufacturing apparatus for assembling a wiring harness having electric wires and connectors attached to the electric wires comprises: wire stocking units each to stock the electric wires; and cutting units each to cut the electric wires stocked in the wire stocking units in desirable lengthes and to attach terminal fittings of the connectors to the respective electric wires; and joining units to connect the electric wires which have been cut in desirable lengthes by the cutting units and to which the respective terminal fittings have been attached, wherein, a coloring means to color an outer surface of each of the electric wires is attached to one of the wire stocking units, the cutting units, and the joining units.

Like this, the coloring means to color the electric wire are attached to one of the wire stocking units, the cutting units, and the joining units. Like this, the coloring means need not to be provided on all the wire stocking units, the cutting units, and the joining units. And, the electric wire is colored by the coloring means in a step for assembling the wiring harness. Therefore, the article number (the kind of color of the outer surface) of the electric wire stocked by the wire stocking units can be reduced.

BRIEF DESCRIPTION OF THE DRAWINGS

FIG. 3(*b*) is an explanatory illustration of an electric wire colored by the painting device of FIG. 3(*a*).

FIG. 4(*b*) is an explanatory illustration of an electric wire colored by the painting device of FIG. 4(*a*).

FIG. 5(*b*) is an explanatory illustration of an electric wire colored by the painting device of FIG. 5(*a*).

FIG. 6(*b*) is an explanatory illustration of an electric wire colored by the painting device of FIG. 6(*a*).

FIG. 7(*b*) is an explanatory illustration of an electric wire colored by the painting device of FIG. 7(*a*).

FIG. 8(*b*) is an explanatory illustration of an electric wire colored by the painting device of FIG. 8(*a*).

FIG. 10(*b*) is an explanatory illustration showing the electric wire whose covering portion has been partly removed. FIG. 10(*c*) is an explanatory illustration showing the electric wire to which a terminal fitting is attached.

FIG. 11(*b*) is an explanatory illustration showing the electric wire whose covering portion has been partly removed. FIG.

11(*c*) is an explanatory illustration showing the electric wire to which a terminal fitting is attached.

Figure 1:
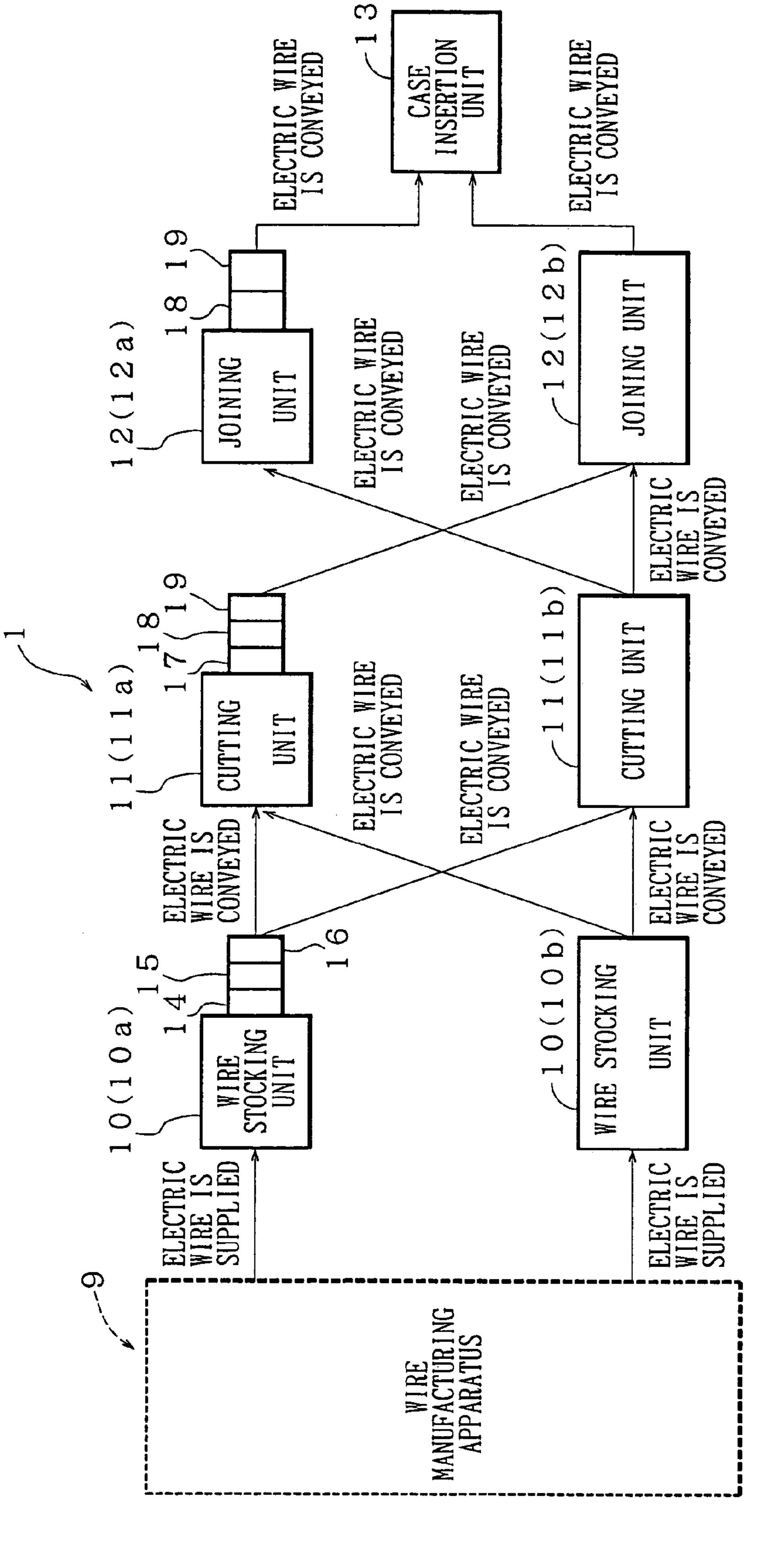
FIG. 1 is a block diagram showing the structure of a wiring harness manufacturing apparatus in accordance with the first embodiment of the present invention.

FIG. 12(*a*) is an explanatory illustration showing a third example of an electric wire to be assembled by using the wiring harness manufacturing apparatus shown in FIG. 1. FIG. 12(*b*) is an explanatory illustration showing the electric wire whose covering portion has been partly removed. FIG. 12(*c*) is an explanatory illustration showing the electric wire to which a terminal fitting is attached. FIG. 12(*d*) is an explanatory illustration showing the electric wire on which a mark is put and to which a terminal fitting is attached.

FIG. 13(*a*) is an explanatory illustration showing a fourth example of an electric wire to be assembled by using the wiring harness manufacturing apparatus shown in FIG. 1. FIG. 13(*b*) is an explanatory illustration showing the electric wire whose covering portion has been partly removed. FIG. 13(*c*) is an explanatory illustration showing the electric wire to which a terminal fitting is attached. FIG. 13(*d*) is an explanatory illustration showing the electric wire on which a mark is put and to which a terminal fitting is attached.

Figure 14:
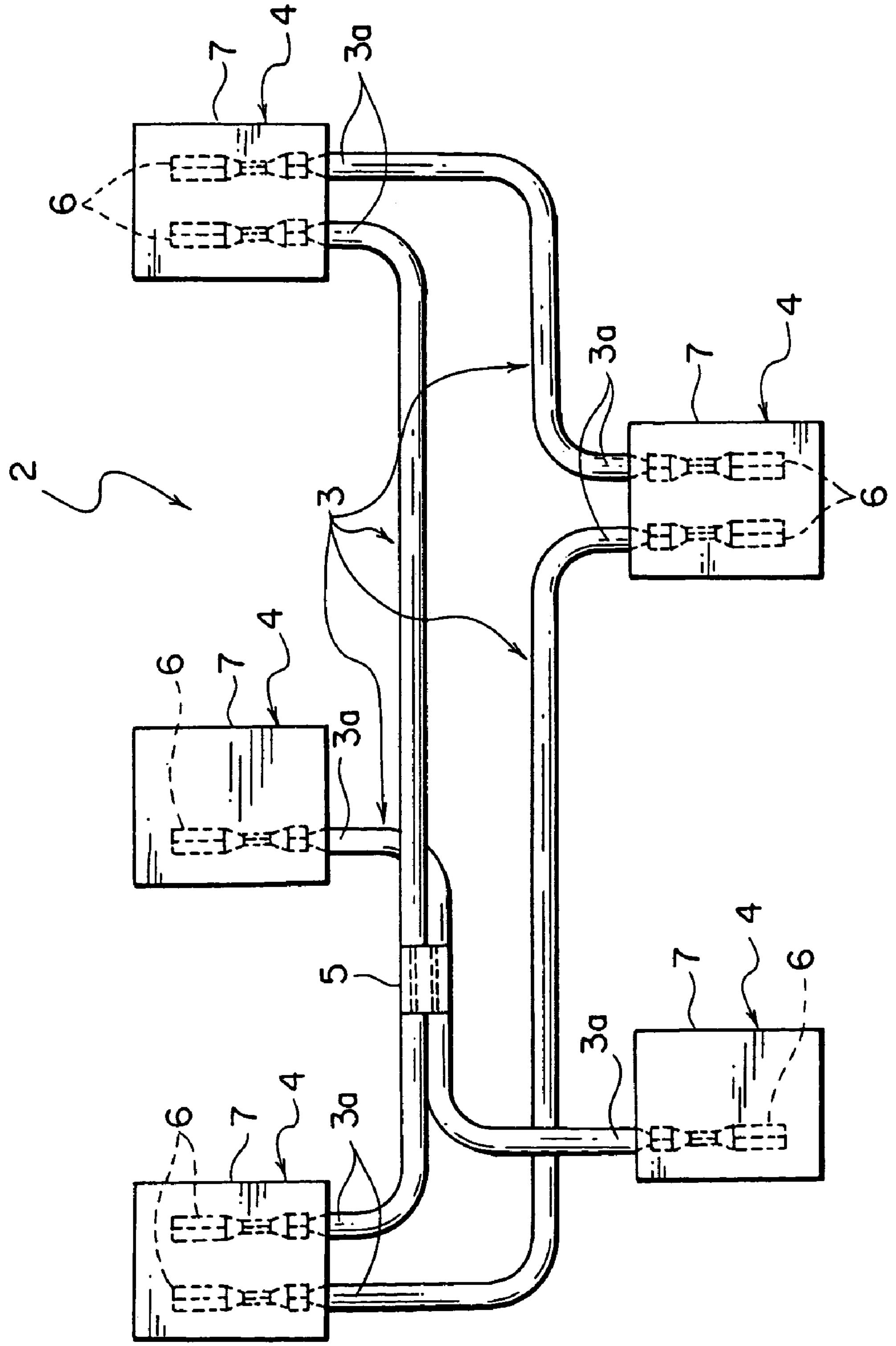

FIG. 14 is a schematic illustration showing the structure of the wiring harness assembled by the wiring harness manufacturing apparatus shown in FIG. 1.

Figure 15:
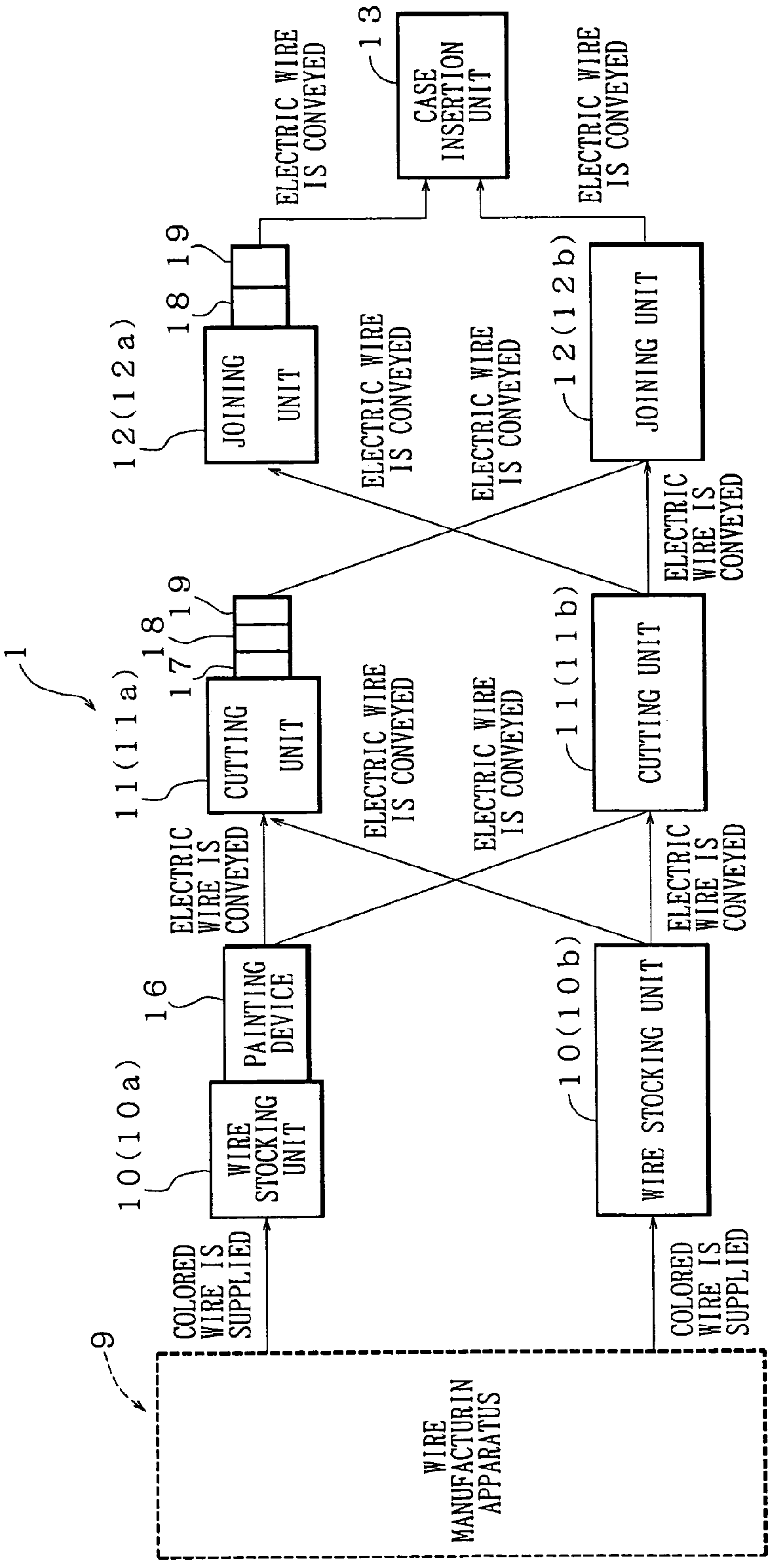

FIG. 15 is a block diagram showing the structure of a wiring harness manufacturing apparatus in accordance with the second embodiment of the present invention.

Figure 16:
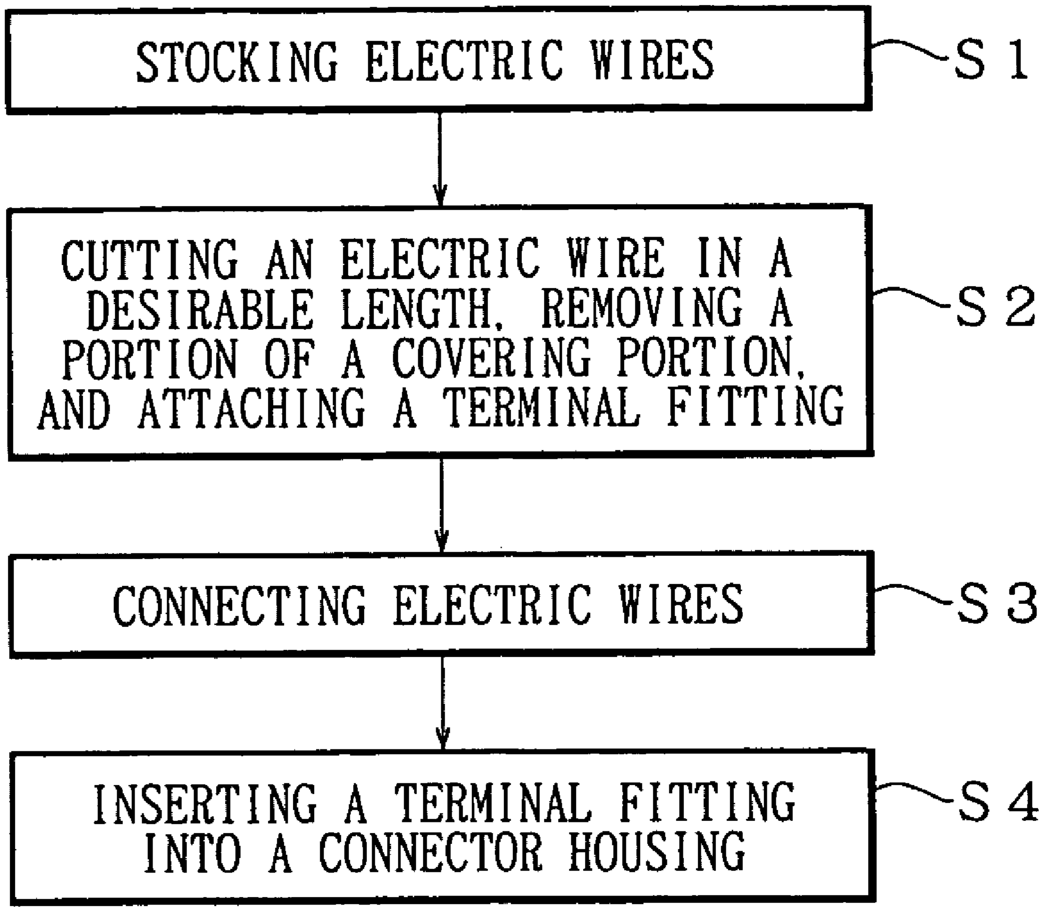

FIG. 16 is a flowchart for manufacturing a wiring harness by using the wiring harness manufacturing apparatus shown in FIG. 15.

Figure 17:
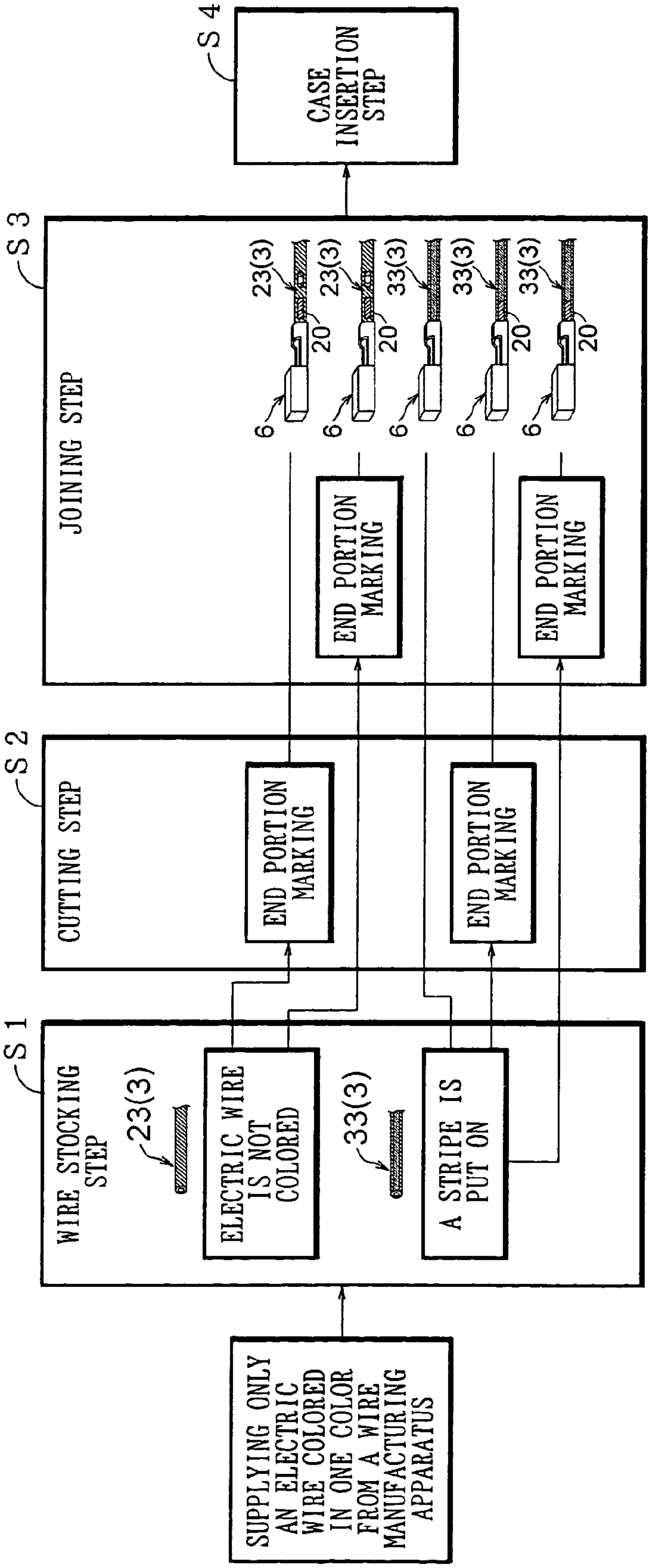

FIG. 17 is a block diagram showing wiring harness manufacturing steps, using the wiring harness manufacturing apparatus shown in FIG. 15, and rough appearances the electric wires.

Figure 18A:
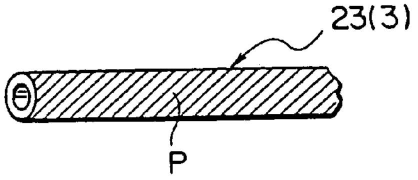
Figure 18B:
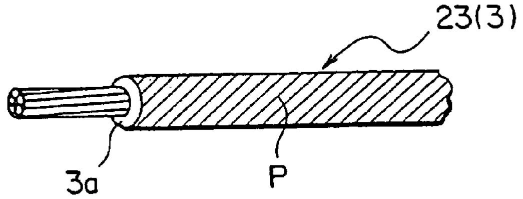
Figure 18C:
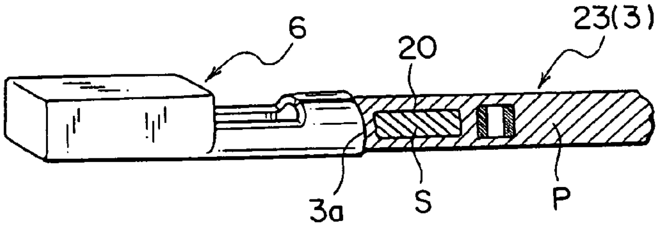
Figure 19A:
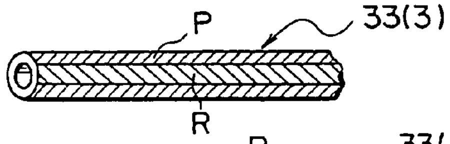
Figure 19B:
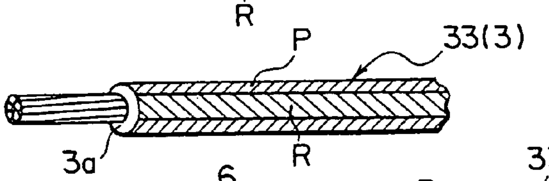
Figure 19C:
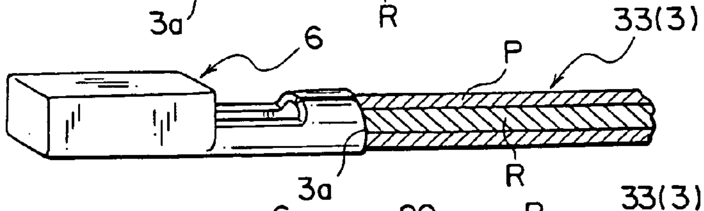
Figure 19D:
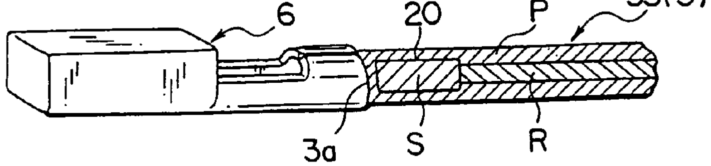

FIG. 18(*a*) is an explanatory illustration showing an example of an electric wire to be assembled by using the wiring harness manufacturing apparatus shown in FIG. 15. FIG. 18(*b*) is an explanatory illustration showing the electric wire whose covering portion has been partly removed. FIG. 18(*c*) is an explanatory illustration showing the electric wire to which a terminal fitting is attached.

FIG. 19(*a*) is an explanatory illustration showing another example of an electric wire to be assembled by using the wiring harness manufacturing apparatus shown in FIG. 15. FIG. 19(*b*) is an explanatory illustration showing the electric wire whose covering portion has been partly removed. FIG. 19(*c*) is an explanatory illustration showing the electric wire to which a terminal fitting is attached. FIG. 19(*d*) is an explanatory illustration showing the electric wire on which a mark is put and to which a terminal fitting is attached.

BEST MODE OF THE INVENTION

The first embodiment of the inventive wiring harness manufacturing method and wiring harness manufacturing apparatus will now be described in further detail with reference to FIGS. 1–14. A wiring harness manufacturing apparatus 1, shown in FIG. 1, in accordance with the first embodiment manufactures or assembles a wiring harness 2 shown in FIG. 14.

The wiring harness 2 is arranged on a motor vehicle. The wiring harness 2 has electric wires 3, connectors 4, and joint-terminals 5 as shown in FIG. 14. The electric wire 3 is a covered wire having a conductive core wire and an insulative covering portion covering the core wire. The electric wires 3 are bundled.

The connector 4 has a conductive terminal fitting 6 and an insulative connector housing 7. The terminal fitting 6 is formed by bending a conductive sheet metal. The terminal fitting 6 is attached to an end portion 3*a* of the electric wire 3. The terminal fitting 6 is electrically-connected with the core wire of the electric wire 3. The connector housing 7 is formed in a box-shape. The connector housing 7 accommodates the terminal fitting 6. Like this, the terminal fitting 6 is attached to the connector housing 7.

The joint-terminal 5 is made of conductive sheet metal. The joint-terminal 5 electrically-connects core wires of the respective electric wires 3. At the connecting portion of the electric wires 3, the covering portions of the electric wires 3 are removed, and the core wires are exposed. The joint-terminal 5 covers the exposed core wires. The joint-terminal 5 crimps the core wires of the electric wires 3, thereby electrically-connecting the electric wires 3.

In the wiring harness 2 of the above structure, the electric wires 3 have been cut off in desirable lengthes, and the covering portions of the end portions 3*a* have been removed. The terminal fittings 6 are crimped to the core wires exposed from the end portions 3*a*. The covering portions of the connecting portion of the electric wires 3*a* are removed. The core wires exposed from the connecting portion are crimped by the joint-terminal 5 so as to connect the electric wires 3. The terminal fitting 6 is inserted into, and attached to, the connector housing 7.

Like this, the wiring harness 2 of the above structure is assembled. The wiring harness 2 connects a plurality of electronic equipment mounted on a motor vehicle by coupling the above connectors 4 with mating connectors of the electronic equipment. The wiring harness 2 supplies electric power or transmits control signals to the electronic equipment.

The wiring harness manufacturing apparatus 1 assembles or manufactures the wiring harness 2 of the above structure. The wiring harness manufacturing apparatus 1 has wire stocking units 10, cutting units 11, joining units 12 and case insertion unit 13 as shown in FIG. 1. In the embodiment shown in FIG. 1, the wiring harness manufacturing apparatus 1 has a pair of wire stocking units 10, a pair of cutting units 11 and a pair of joining units 12.

The electric wire 3 is supplied to the wire stocking unit 10 from a wire manufacturing apparatus 9. The electric wire 3 is, for example, rolled on a real. The wire manufacturing apparatus 9 makes the above core wire from conductive metal such as copper. The core wire is covered with insulative synthetic resin by the wire manufacturing apparatus 9. The covering portion of the electric wire 3 made by the wire manufacturing apparatus 9 is in a non-colored state. That is, a non-colored electric wire 3 is supplied to the wire stocking unit 10. Here, the non-colored electric wire 3 has the covering portion of synthetic resin in which colorant is not put. That is, the covering portion of the non-colored electric wire 3 has a color of synthetic resin itself.

In this specification, "to color the outer surface of the electric wire 3" means to color the outer surface of the covering portion of the electric wire 3 with a colorant. The colorant is a liquid substance in which color material (organic substance for industry) is dissolved and dispersed in water or in other solvent. As the organic substance, there exists dyes and pigments (mostly organic substance and synthetic material). In the present specification, "colorant" means both paint and coloring liquid.

In the coloring liquid, the dye is dissolved or dispersed in the solvent. In the paint, the pigment is dispersed in the dispersion liquid. Therefore, when the outer surface of the covering portion is colored by the coloring liquid, the dye soaks into in the covering portion, and when the outer surface of the covering portion is colored by the paint, the pigment adheres to the outer surface without soaking into the covering portion. That is, "to color the outer surface of the covering portion of the electric wire" in the present specification means to dye the outer surface of the covering portion of the electric wire 3 with the dye and also to paint the pigment on the outer surface of the covering portion of the electric wire 3.

And, the solvent and the dispersion liquid should have an affinity for synthetic resin forming the covering portion of the electric wire 3 so that the dye securely soaks into the covering portion of the electric wire 3 and the pigment securely adheres to the outer surface of the covering portion of the electric wire 3.

The wire stocking unit 10 once stocks the electric wire 3 supplied from the wire manufacturing apparatus 9. The painting devices 14, 15, 16 as the coloring means are attached to one of the pair of wire stocking units 10 (hereinafter, 10*a*). The painting devices 14, 15, 16 color the outer surface of the above electric wire 3 differently from a color of synthetic resin of the covering portion.

Each of the pair of wire stocking units 10*a*, 10*b* supplies the electric wires 3 to the respective cutting units 11. The electric wire 3 supplied to the cutting unit 11 is in a state of being rolled on a reel. The cutting unit 11 cuts off the electric wire 3 in a desirable length. The cutting unit 11 removes the covering portions of the end portions 3*a* of the electric wire 3. The cutting unit 11 attaches the terminal fittings 6 to the respective end portions 3*a* of the electric wire 3.

At least one of the painting devices 17, 18, 19 is attached to one cutting unit (hereinafter, 11*a*) of the pair of cutting units 11. In the illustrated embodiment, the painting devices 17, 18, 19 are attached to the cutting unit 11*a*. The painting devices 17, 18, 19 color the outer surface of the above electric wire 3 differently from a color of synthetic resin of the covering portion.

At least one of the painting devices 18, 19 as the coloring means is attached to one joining unit (hereinafter, 12*a*) of the pair of joining units 12. In the illustrated embodiment, the painting devices 18, 19 are attached to the joining unit 12*a*. The painting devices 18, 19 color the outer surface of the above electric wire 3 differently from a color of synthetic resin of the covering portion.

The electric wire 3, to which the terminal fittings 6 have been attached by the other cutting unit 11*b*, is supplied to the joining unit 12*a* from the cutting unit 11*b*. The electric wire 3, to which the terminal fittings 6 have been attached, is supplied to the other joining unit 12*b* from each of the pair of cutting units 11*a*, 11*b*. The joining units 12*a*, 12*b* remove the covering portions of the above-described connecting portions of the electric wires 3 and crimp the core wires with the joint-terminal 5 so as to connect the electric wires 3.

The electric wire 3 with the terminal fitting 6 is supplied to the case insertion unit 13 from each of the pair of joining units 12*a*, 12*b*. The case insertion unit 13 inserts the terminal fitting 6 attached to the end portion 3*a* of the electric wire 3 into the connector housing 7, thereby assembling the connector 4.

Figure 3A:
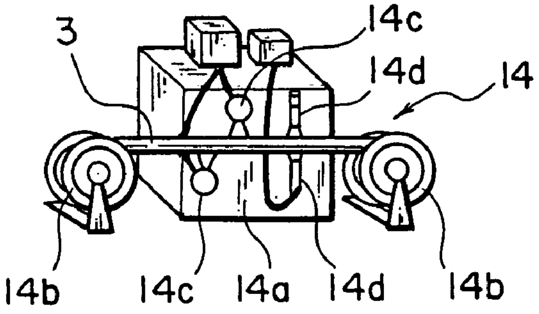
FIG. 3(*a*) is an explanatory illustration of a painting device attached to a wire stocking unit of the wiring harness manufacturing apparatus shown in FIG. 1.
Figure 3B:
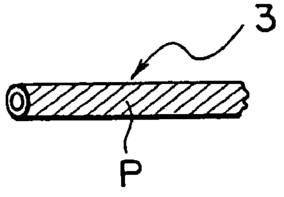

The painting device 14 has an apparatus body 14*a*, a pair of rollers 14*b*, a plurality of sprayers 14*c* and a dryer 14*d* as shown in FIG. 3(*a*). The pair of rollers 14*b* are arranged with some interval, and the electric wire 3 is arranged between the rollers 14*b*.

A pair of sprayers 14*c* are provided in the illustrated embodiment. The sprayer 14*c* sprays the colorant toward the electric wire 3 traveling between the rollers 14*b*. The pair of sprayers 14*c* color the outer surface of the electric wire 3 over the whole periphery thereof. The sprayers 14*c* color the outer surface of the electric wire 3 differently from a color of synthetic resin of the covering portion over the whole periphery of the electric wire 3.

The drier 14*d* is arranged downstream of the sprayers 14*c* in a traveling direction of the electric wire 3. The drier 14*d* dries the colorant blown on the outer surface of the electric wire 3 by the sprayers 14*c*. The painting device 14 of the above structure colors the outer surface of the electric wire 3 in a color P (a hatched portion in FIG. 3(*b*)) different from a color of synthetic resin of the covering portion over the whole periphery of the electric wire 3.

Figure 4A:
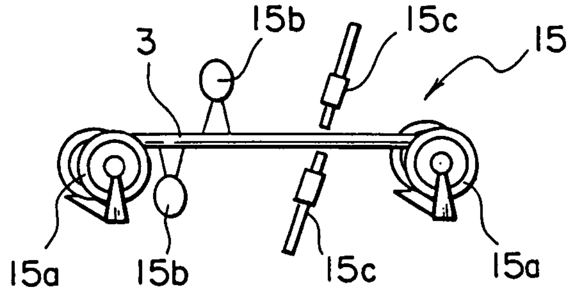
FIG. 4(*a*) is an explanatory illustration of another painting device attached to the wire stocking unit of the wiring harness manufacturing apparatus shown in FIG. 1.
Figure 4B:
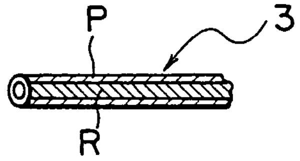

The painting device 15 has a pair of rollers 15*a*, sprayers 15*b* and markers 15*c* as shown in FIG. 4(*a*). The pair of rollers 15*a* are arranged with some interval, and the electric wire 3 is arranged between the rollers 15*a*.

A pair of sprayers 15*b* are provided in the illustrated embodiment. The sprayer 15*b* sprays the colorant toward the electric wire 3 traveling between the rollers 15*a*. The sprayers 15*b* color the outer surface of the electric wire 3. The sprayers 15*b* color the outer surface of the electric wire 3 differently from a color of synthetic resin of the covering portion over the whole periphery of the electric wire 3.

A pair of markers 15*c* are provided in the illustrated embodiment. The markers 15*c* are arranged downstream of the sprayers 15*b* in a traveling direction of the electric wire 3. The marker 15*c* puts the colorant partly on the outer surface of the electric wire 3, which colorant has a color different from both the color colored by the sprayer 15*b* and the color of the covering portion.

In the painting device 15 of the above structure, the sprayer 15*b* colors the outer surface of the electric wire 3 in a color P (a hatched portion in FIG. 4(*b*)) different from a color of synthetic resin of the covering portion over the whole periphery of the electric wire 3. And then, the marker 15*c* colors the outer surface, having been colored by the sprayer 15*b*, in a color R different from the color P and the color of the covering portion itself. The painting device 15 colors the outer surface of the electric wire 3 in a pattern of stripe of the colors P, R as shown in FIG. 4(*b*).

Figure 5A:
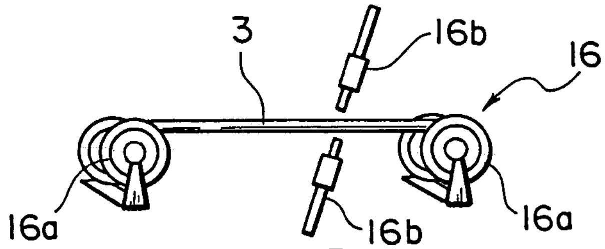
FIG. 5(*a*) is an explanatory illustration of still another painting device attached to the wire stocking unit of the wiring harness manufacturing apparatus shown in FIG. 1.
Figure 5B:
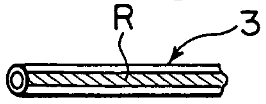

The painting device 16 has a pair of rollers 16*a* and a plurality of markers 16*b* as shown in FIG. 5(*a*). The pair of rollers 16*a* are arranged with some interval, and the electric wire 3 is arranged between the rollers 16*a*.

A pair of markers 16*b* are provided in the illustrated embodiment. The marker 16*b* partly put a colorant on the outer surface of the electric wire 3. The pair of markers 16*b* partly color the outer surface of the electric wire 3 differently from a color of synthetic resin of the covering portion.

In the painting device 16 of the above structure, the marker 16*b* partly colors the outer surface of the electric wire 3 in a color R (a hatched portion in FIG. 5(*b*)) different from a color of synthetic resin of the covering portion. The painting device 16 colors the outer surface of the electric wire 3 in a pattern of stripe of the color R as shown in FIG. 5(*b*).

Figure 6A:
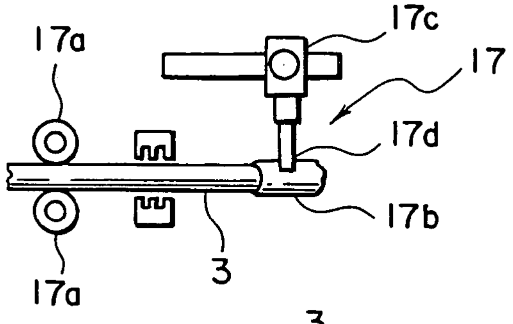
FIG. 6(*a*) is an explanatory illustration of a painting device attached to a cutting unit of the wiring harness manufacturing apparatus shown in FIG. 1.
Figure 6B:
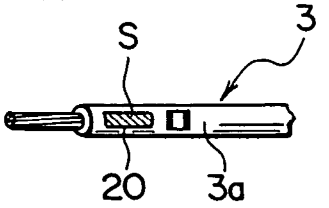

The painting device 17 has a pair of running rollers 17*a*, a tubular member 17*b* and a coloring unit 17*c* as shown in FIG. 6(*a*). The pair of running rollers 17*a* put the electric wire 3 therebetween and make the electric wire 3 run.

The tubular member 17*b* is formed tubularly in order to receive the end portion 3*a* of the electric wire 3. The tubular member 17*b* is provided with a through-hole 17*d*. The coloring unit 17*c* partly puts a colorant on the outer surface of the electric wire 3 in the tubular member 17*b* through the through-hole 17*d*. The coloring unit 17*c* partly colors the outer surface of the electric wire 3 differently from a color of synthetic resin of the covering portion (that is, marking is carried out on the end portion).

In the painting device 17 of the above structure, the coloring unit 17*c* partly colors the outer surface of the electric wire 3 in a color S (a hatched portion in FIG. 6(*b*)) different from the colors P, R. The painting device 17 partly colors the outer surface of the electric wire 3 in the color S so as to form a mark 20 as shown in FIG. 6(*b*).

Figure 7A:
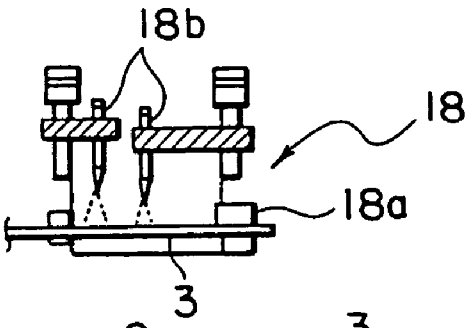
FIG. 7(*a*) is an explanatory illustration of an example of a painting device attached to a cutting unit and a joining unit of the wiring harness manufacturing apparatus shown in FIG. 1.
Figure 7B:
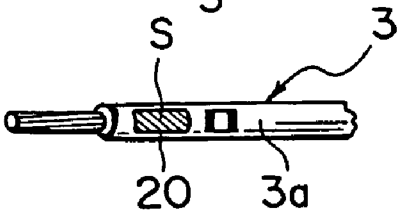

The painting device 18 has wire dampers 18*a* and sprayers 18*b* as shown in FIG. 7(*a*). The wire damper 18*a* clamps the end portion 3*a* of the electric wire 3. The sprayer 18*b* partly sprays a colorant on the outer surface of the end portion 3*a* of the electric wire 3. The sprayer 18*b* partly colors the outer surface of the electric wire 3 differently from a color of synthetic resin of the covering portion (that is, marking is carried out on the end portion).

In the painting device 18 of the above structure, the sprayer 18*b* partly colors the outer surface of the electric wire 3 in a color S (a hatched portion in FIG. 7(*b*)) different from the colors P, R. The painting device 18 partly colors the outer surface of the electric wire 3 in the color S so as to form a mark 20 as shown in FIG. 7(*b*).

Figure 8A:
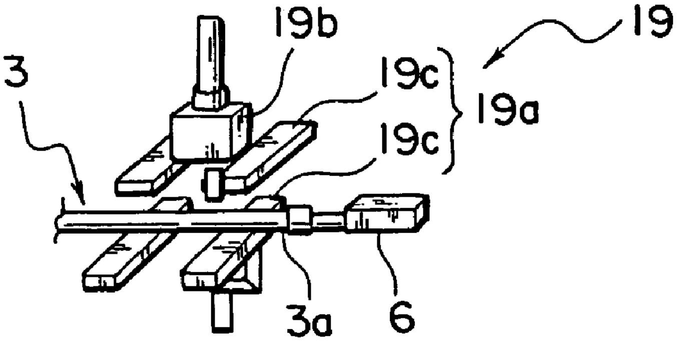
FIG. 8(*a*) is an explanatory illustration of another example of a painting device attached to a cutting unit and a joining unit of the wiring harness manufacturing apparatus shown in FIG. 1.
Figure 8B:
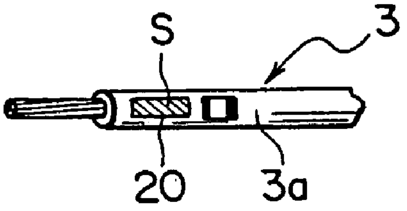

The painting device 19 has wire dampers 19*a* and a stamper 19*b* as shown in FIG. 8(*a*). The wire damper 19*a* has holding members 19*c*, 19*c* which close and open each other. The wire clamper 19*a* sandwiches the end portion 3*a* of the electric wire 3 between the holding members 19*c*, 19*c*.

The stamper 19*b* moves relative to the end portion 3*a* of the electric wire 3 along with the holding members 19*c*, 19*c*. That is, the stamper 19*b* approaches the end portion 3*a* of the electric wire 3 when the holding members 19*c*, 19*c* close each other. The stamper 19*b* is put into contact with the end portion 3*a* and partly puts a colorant on the outer surface of the end portion 3*a*. The stamper 19*b* partly colors the outer surface of the electric wire 3 differently from a color of synthetic resin of the covering portion (that is, marking is carried out on the end portion).

In the painting device 19 of the above structure, the stamper 19*b* partly colors the outer surface of the electric wire 3 in a color S (a hatched portion in FIG. 8(*b*)) different from the colors P, R. The painting device 19 partly colors the outer surface of the electric wire 3 in the color S so as to form a mark 20 as shown in FIG. 8(*b*).

Figure 2:
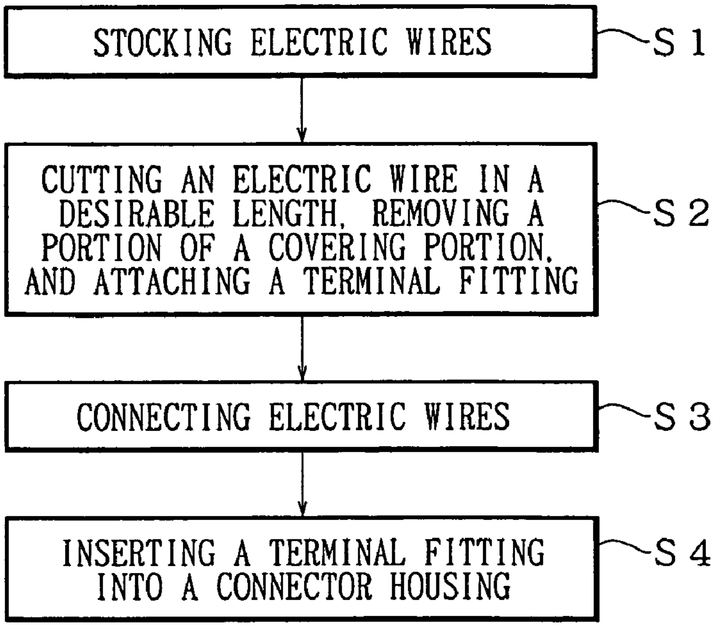
FIG. 2 is a flowchart for manufacturing a wiring harness by using the wiring harness manufacturing apparatus shown in FIG. 1.
Figure 9:
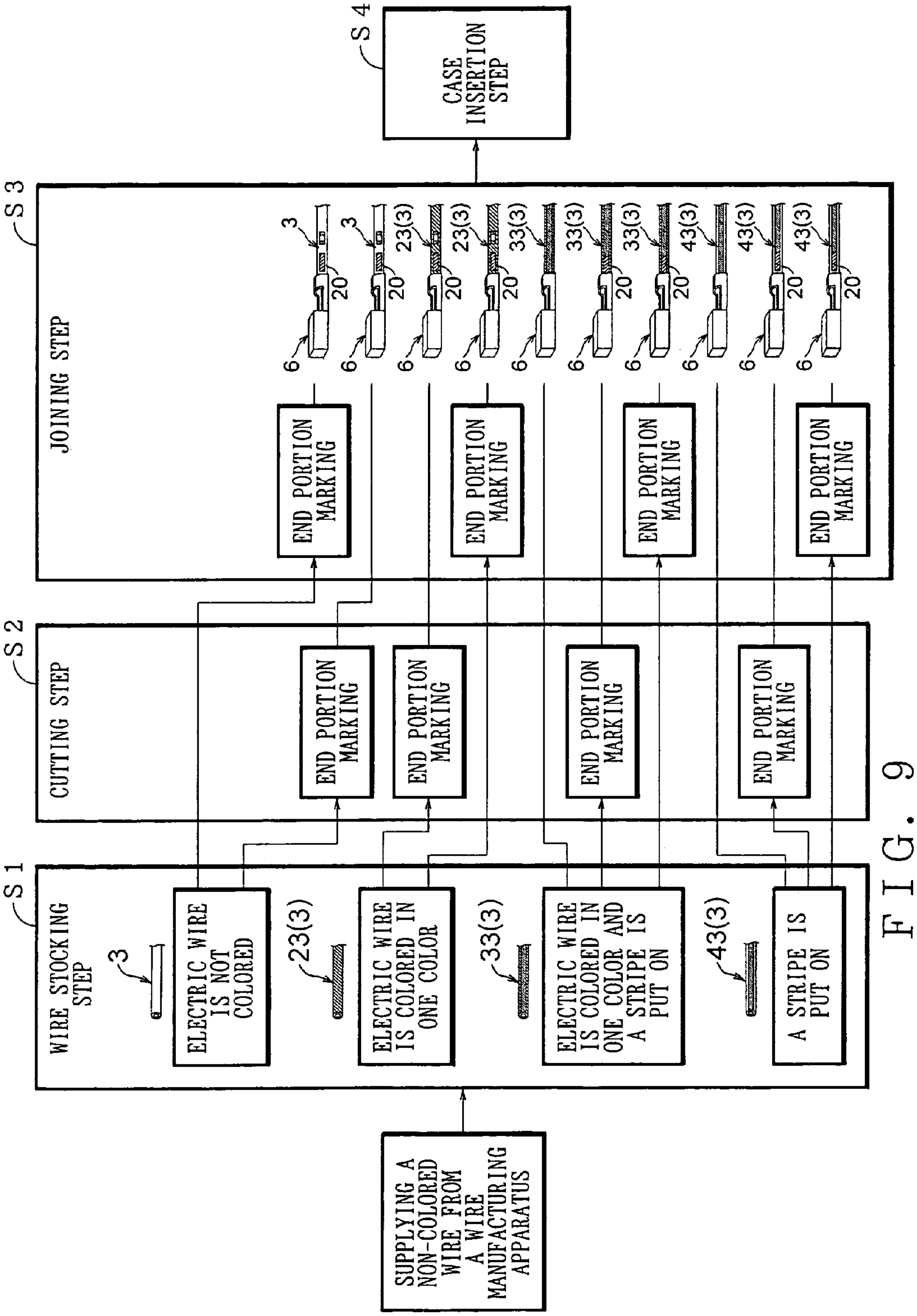
FIG. 9 is a block diagram showing wiring harness manufacturing steps, using the wiring harness manufacturing apparatus shown in FIG. 1, and rough appearances the electric wires.

When the wiring harness 2 is manufactured by using the above wiring harness manufacturing apparatus 1, the electric wire 3 wound up on a reel is firstly stocked once in each of the wire stocking units 10*a*, 10*b* at Step S1 as a wire stocking step in FIG. 2 and FIG. 9.

The wire stocking unit 10*a* colors the outer surface of the electric wire 3 over the whole periphery thereof by using the painting device 14, forms (colors) a stripe pattern on the outer surface of the electric wire 3 by using the painting device 15, or forms (colors) a stripe pattern on the outer surface of the electric wire 3 by using the painting device 16. And then, Step S2 (shown in FIG. 2 and FIG. 9) as a cutting step is reached.

In Step S2, the electric wires 3 are conveyed toward the cutting units 11*a*, 11*b* from the wire stocking units 10*a*, 10*b*. The cutting units 11*a*, 11*b* cut off the electric wires 3 in desirable lengthes, remove the covering portions of the end portions 3*a*, and attach the terminal fittings 6 to the end portions 3*a*.

The cutting unit 11*a* forms the mark 20 on the end portion 3*a* of the electric wire 3 by using one of the painting devices 17, 18, 19 (that is, marking is carried out on the end portion). And then, Step S3 (shown in FIG. 2 and FIG. 9) as a joining step is reached.

In Step S3, the electric wire 3 is conveyed toward the joining unit 12*b* from the cutting unit 11*a*, and the electric wires 3 are conveyed toward the joining units 12*a*, 12*b* from the cutting unit 11*b*. The joining units 12*a*, 12*b* remove the covering portions of the connecting portions of the electric wires 3 and connect the electric wires 3 with the joint-terminal 5.

The joining unit 12*a* forms the mark 20 on the end portion 3*a* of the electric wire 3 by using one of the painting devices 18, 19 (that is, marking is carried out on the end portion). And then, Step S4 (shown in FIG. 2 and FIG. 9) as a case insertion step is reached.

In Step S4, the electric wires 3 are conveyed toward the case insertion unit 13 from the joining units 12*a*, 12*b*. The case insertion unit 13 inserts the terminal fitting 6 attached to the end portion 3*a* of the electric wire 3 into the connector housing 7. Like this, the wiring harness manufacturing apparatus 1 assembles the wiring harness 2.

Figure 10A:
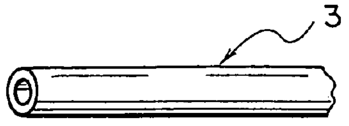
FIG. 10(*a*) is an explanatory illustration showing a first example of an electric wire to be assembled by using the wiring harness, manufacturing apparatus shown in FIG. 1.
Figure 10B:
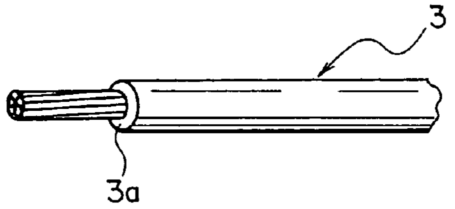
Figure 10C:
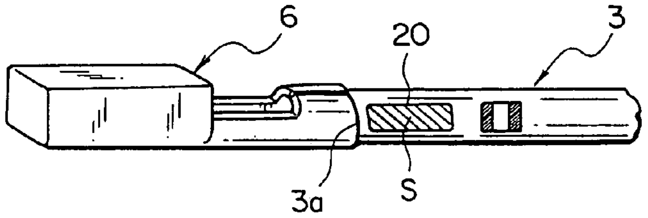

As above, when the non-colored electric wire 3 shown in FIG. 10(*a*) is supplied to the wire stocking unit 10*b*, the covering portion of the end portion 3*a* is removed as shown in FIG. 10(*b*) at the cutting step. Subsequently, the above mark 20 is formed in either the cutting step or the joining steps, that is, in either the cutting unit 11*a* or the joining unit 12*a*. As shown in FIG. 10(*c*), the electric wire 3 with the terminal fitting 6 at the end portion 3*a* thereof is obtained.

Figure 11A:
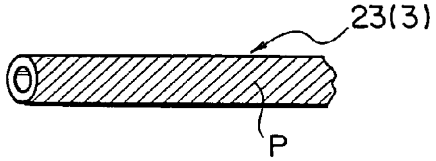
FIG. 11(*a*) is an explanatory illustration showing a second example of an electric wire to be assembled by using the wiring harness manufacturing apparatus shown in FIG. 1.
Figure 11B:
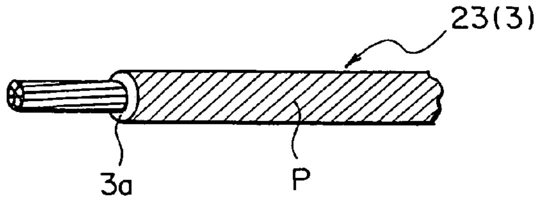
Figure 11C:
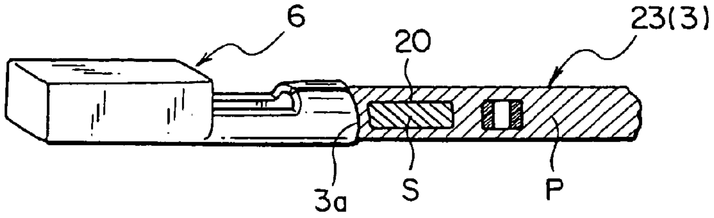
Figure 12A:
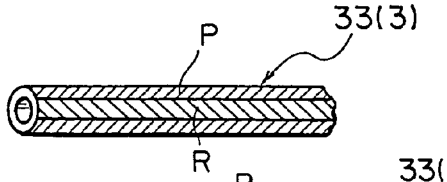
Figure 12B:
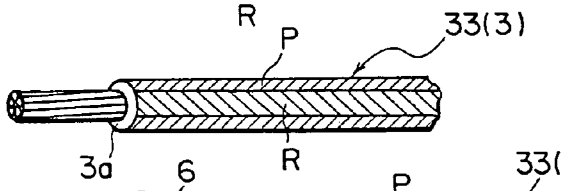
Figure 12C:
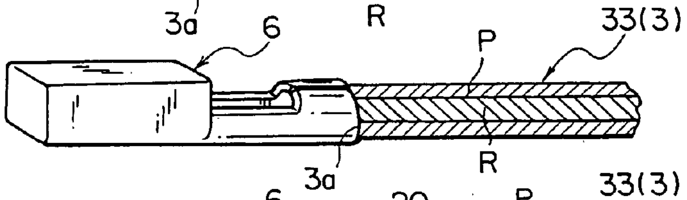
Figure 12D:
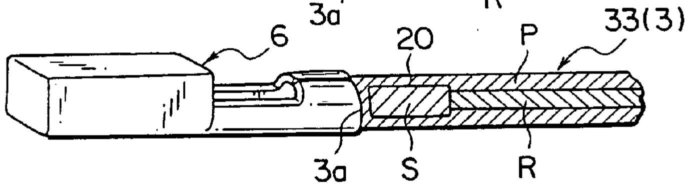
Figure 13A:
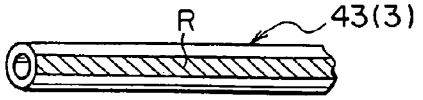
Figure 13B:
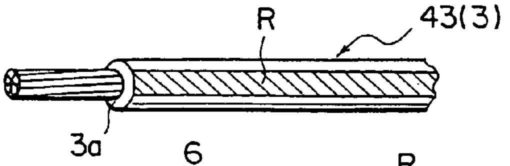
Figure 13C:
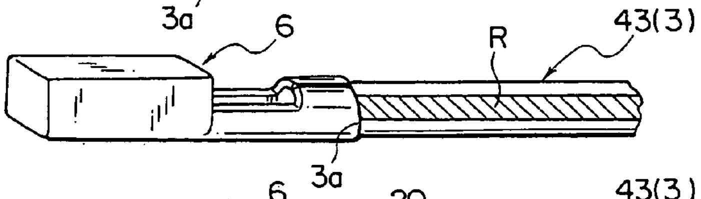
Figure 13D:
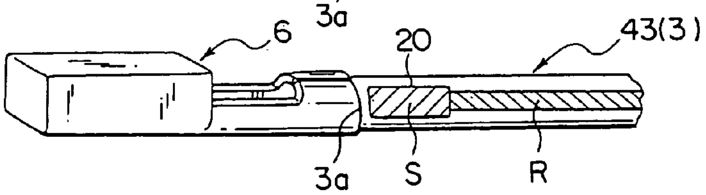

Upon the supply of the non-colored electric wire 3 to the wire stocking unit 10*a*, the electric wire 3 is colored by using the painting device 14. Then, as shown in FIG. 11(*a*), the electric wire 3 (hereinafter, 23) colored in the color P over the whole periphery thereof is obtained. The covering portion of the end portion 3*a* is removed at the cutting step as shown in FIG. 11(*b*). Subsequently, the above mark 20 is formed in either the cutting step or the joining steps, that is, in either the cutting unit 11*a* or the joining unit 12*a*. As shown in FIG. 11(*c*), the electric wire 3 with the terminal fitting 6 at the end portion 3*a* thereof is obtained.

Upon the supply of the non-colored electric wire 3 to the wire stocking unit 10*a*, the electric wire 3 is colored by using the painting device 15. Then, as shown in FIG. 12(*a*), the electric wire 3 (hereinafter, 33) with a stripe pattern in the colors P, R is obtained. The covering portion of the end portion 3*a* is removed at the cutting step as shown in FIG. 12(*b*).

Subsequently, the above mark 20 is formed in either the cutting step or the joining steps, that is, in either the cutting unit 11*a* or the joining unit 12*a*. As shown in FIG. 12(*d*), the electric wire 3 with the terminal fitting 6 at the end portion 3*a* thereof is obtained. On the other hand, the electric wire 33 shown in FIG. 12(*b*) is conveyed to the cutting unit 11*b* and the joining unit 12*b*. And then, the electric wire 33 with the terminal fitting 6 at the end portion 3*a* thereof but without a mark is obtained as shown in FIG. 12(*c*).

Upon the supply of the non-colored electric wire 3 to the wire stocking unit 10*a*, the electric wire 3 is colored by using the painting device 16. Then, as shown in FIG. 13(*a*), the electric wire 3 (hereinafter, 43) with a stripe pattern in the color R is obtained. The covering portion of the end portion 3*a* is removed at the cutting step as shown in FIG. 13(*b*).

Subsequently, the above mark 20 is formed in either the cutting step or the joining steps, that is, in either the cutting unit 11*a* or the joining unit 12*a*. As shown in FIG. 13(*d*), the electric wire 3 with the terminal fitting 6 at the end portion 3*a* thereof is obtained. On the other hand, the electric wire 43 shown in FIG. 13(*b*) is conveyed to the cutting unit 11*b* and the joining unit 12*b*. And then, the electric wire 43 with the terminal fitting 6 at the end portion 3*a* thereof but without a mark is obtained as shown in FIG. 13(*c*).

According to the present embodiment, as shown in FIG. 9, the outer surface of the electric wire 3 is colored in one of the wire stocking step and the cutting step. And, as shown in FIG. 9, the outer surface of the electric wire 3 is colored in one of the wire stocking step, the cutting step and the joining step. Further, the outer surface of the electric wire 3 is colored in one of the cutting step and the joining step. Like this, the electric wire 3 is not necessarily colored in all the steps. Therefore, the painting devices 14, 15, 16, 17, 18, 19 to color the electric wire 3 need not to be provided on all the wire stocking units 10*a*, 10*b*, the cutting units 11*a*, 11*b*, and the joining units 12*a*, 12*b*. Therefore, the number of the painting devices 14, 15, 16, 17, 18, 19 can be reduced, and the space for the wiring harness manufacturing apparatus 1 can be reduced.

And, because the electric wire 3 is not necessarily colored in all the steps, all the electric wires 3 need not to be conveyed to the painting devices 14, 15, 16, 17, 18, 19 from the wire stocking units 10*a*, 10*b*, the cutting units 11*a*, 11*b*, and the joining units 12*a*, 12*b*. Therefore, the conveying work of the electric wires 3 can be reduced, and production efficiency for manufacturing the wiring harness 2 can be improved, thereby reducing the production cost of the wiring harness 2.

Further, the electric wire 3 is colored in a step for assembling the wiring harness 2. Therefore, the article number (the kind of color of the outer surface) of the electric wire 3 stocked by the wire stocking units 10*a*, 10*b*can be reduced. Therefore, trouble of controlling the electric wire 3 can be reduced, which could prevent the article number from being mistaken during the assembly of the wiring harness 2. Therefore, the yield of the wiring harness 2 can be improved.

The painting devices 14, 15, 16, 17, 18, 19 to color the electric wire 3 are attached only to the wire stocking unit 10*a*, the cutting unit 11*a*, and the joining unit 12*a*. Like this, the painting devices 14, 15, 16, 17, 18, 19 to color the electric wire 3 need not to be provided on all the wire stocking units 10*a*, 10*b*, the cutting units 11*a*, 11*b*, and the joining units 12*a*, 12*b*. Therefore, the number of the painting devices 14, 15, 16, 17, 18, 19 can be reduced, and the space for the wiring harness manufacturing apparatus 1 can be reduced, thereby reducing the production cost of the wiring harness 2.

Next, the second embodiment of the inventive wiring harness manufacturing method and wiring harness manufacturing apparatus will now be described in further detail with reference to FIGS. 15–19. Here, the same references are assigned to the same elements or members as the above first embodiment, and the description thereof is omitted.

An electric wire 23 colored in a color P over the whole periphery is supplied from a wire manufacturing apparatus 9 to a wiring harness manufacturing apparatus 1 of the present embodiment. A painting device 16 is attached to a wire stocking unit 10*a*.

A wiring harness 2 is assembled through Step S1 to Step S4 shown in FIG. 16 and FIG. 17 by using the wiring harness manufacturing apparatus 1, similarly to the above-described first embodiment.

The electric wire 23 having been colored as shown in FIG. 18(*a*) is supplied to a wire stocking unit 10*b*. Then, a covering portion of an end portion 3*a* is removed as shown in FIG. 18(*b*) in the cutting step. Subsequently, the above mark 20 is formed in either the cutting step or the joining steps, that is, in either the cutting unit 11*a* or the joining unit 12*a* (that is, marking is carried out on the end portion). As shown in FIG. 18(*c*), the electric wire 23 with a terminal fitting 6 at the end portion 3*a* thereof is obtained.

Upon the supply of the colored electric wire 23 to the wire stocking unit 10*a*, the electric wire 23 is colored by using the painting device 16. Then, as shown in FIG. 19(*a*), the electric wire 33 with a stripe pattern in the colors P, R is obtained. The covering portion of the end portion 3*a* is removed at the cutting step as shown in FIG. 19(*b*).

Subsequently, the above mark 20 is formed in either the cutting step or the joining steps, that is, in either the cutting unit 11*a* or the joining unit 12*a* (that is, marking is carried out on the end portion). As shown in FIG. 19(*d*), the electric wire 3 with the terminal fitting 6 at the end portion 3*a* thereof is obtained. On the other hand, the electric wire 33 shown in FIG. 19(*b*) is conveyed to the cutting unit 11*b* and the joining unit 12*b*. And then, the electric wire 33 with the terminal fitting 6 at the end portion 3*a* thereof but without a mark is obtained as shown in FIG. 19(*c*).

According to the present embodiment, similarly to the above-described first embodiment, the painting devices 16, 17, 18, 19 to color the electric wire 3 are attached only to the wire stocking unit 10*a*, the cutting unit 11*a*, and the joining unit 12*a*. Like this, the painting devices 16, 17, 18, 19 to color the electric wire 3 need not to be provided on all the wire stocking units 10*a*, 10*b*, the cutting units 11*a*, 11*b*, and the joining units 12*a*, 12*b*. Therefore, the number of the painting devices 16, 17, 18, 19 can be reduced, and the space for the wiring harness manufacturing apparatus 1 can be reduced, thereby reducing the production cost of the wiring harness 2.

Here, the color and the marking of the electric wires 3, 23, 33, 43 are not used for indicating the steps for assembling the wiring harness 2 as shown in FIG. 10–FIG. 13, FIG. 18, FIG. 19. The color and the marking of the electric wires 3, 23, 33, 43 are used for indicating the kind of electric wire and the electric or electronic system in which the wiring harness 2 is used.

Various electric wires 3, 23, 33, 43 shown in FIG. 10–FIG. 13, FIG. 18, FIG. 19 can be made by using the above-described wiring harness manufacturing apparatus 1. Further, in the present invention, the coloring of the electric wire 3 by the painting devices 14, 15, 16, 17, 18, 19 can be carried out at any step of cutting the electric wire 3, removing the covering portion, attaching the terminal fitting 6, and inserting the terminal fitting 6. Preferably, the coloring of the electric wire 3 by the painting devices 14, 15, 16, 17, 18, 19 is carried out just after any of the above steps.

Here, in the above first and second embodiments of the wiring harness manufacturing apparatus 1, the mark 20 is formed on the electric wires 3, 23 in either the cutting step or the joining step. However, in the present invention, the mark 20 may not be formed on the electric wires 3, 23 in both the cutting step and the joining step.

Further, in the above-described embodiment, the units 10*a*, 11*a*, 12*a* are provided with some of the painting devices 14, 15, 16, 17, 18, 19. However, the painting devices 14, 15, 16, 17, 18, 19 may be provided on any one (one portion) of the units 10*a*, 10*b*, 11*a*, 11*b*, 12*a*, 12*b*. That is, the painting devices 14, 15, 16, 17, 18, 19 may be provided on at least one of the wire stocking unit 10*a* and the cutting unit 11*a*. The painting devices 14, 15, 16, 17, 18, 19 may be provided on at least one of the wire stocking unit 10*a*, the cutting unit 11*a*, and the joining unit 12*a*.

INDUSTRIAL APPLICABILITY

As described above, in the present invention, the electric wire is colored in at least one of the wire stocking step and the cutting step. Like this, since the electric wire is not necessarily colored in all the steps, the device to color the electric wire needs not to be attached to all the units to carry out the wire stocking step and the cutting step. Therefore, the number of the device to color the electric wire can be reduced, and a space for the apparatus for carrying put the wiring harness manufacturing method can be reduced.

And, because the electric wire is not necessarily colored in all the steps, all the electric wires need not to be conveyed to the devices to color the electric wire from the units to carry out the wire stocking step and the cutting step. Therefore, the conveying work of the electric wires can be reduced, and production efficiency for manufacturing the wiring harness can be improved, thereby reducing the production cost of the wiring harness.

Further, the electric wire is colored in a step for assembling the wiring harness. Therefore, the article number (the kind of color of the outer surface) of the electric wire stocked by the wire stocking units can be reduced. Therefore, trouble of controlling the electric wire can be reduced, which could prevent the article number from being mistaken during the assembly of the wiring harness. Therefore, the yield of the wiring harness can be improved.

In the present invention, the electric wire is colored in at least one of the wire cutting step and the joining step. Like this, since the electric wire is not necessarily colored in all the steps, the device to color the electric wire needs not to be attached to all the units to carry out the wire cutting step and the joining step. Therefore, the number of the device to color the electric wire can be reduced, and a space for the apparatus for carrying put the wiring harness manufacturing method can be reduced.

And, because the electric wire is not necessarily colored in all the steps, all the electric wires need not to be conveyed to the devices to color the electric wire from the units to carry out the wire stocking step, the cutting step, and the joining step. Therefore, the conveying work of the electric wires can be reduced, and production efficiency for manufacturing the wiring harness can be improved, thereby reducing the production cost of the wiring harness.

Further, the electric wire is colored in a step for assembling the wiring harness. Therefore, the article number (the kind of color of the outer surface) of the electric wire stocked by the wire stocking units can be reduced. Therefore, trouble of controlling the electric wire can be reduced, which could prevent the article number from being mistaken during the assembly of the wiring harness. Therefore, the yield of the wiring harness can be improved.

In the present invention, the coloring means to color the electric wire are attached to one of the wire stocking units and the cutting units. Like this, the coloring means need not to be provided on all the wire stocking units and the cutting units. Therefore, the number of the coloring means can be reduced, and the space for the wiring harness manufacturing apparatus can be reduced, thereby reducing the production cost of the wiring harness.

And, the electric wire is colored by the coloring means in a step for assembling the wiring harness. Therefore, the article number (the kind of color of the outer surface) of the electric wire stocked by the wire stocking units can be reduced. Therefore, trouble of controlling the electric wire can be reduced, which could prevent the article number from being mistaken during the assembly of the wiring harness. Therefore, the yield of the wiring harness can be improved.

In the present invention, the coloring means to color the electric wire are attached to one of the wire stocking units, the cutting units, and the joining units. Like this, the coloring means need not to be provided on all the wire stocking units, the cutting units, and the joining units. Therefore, the number of the coloring means can be reduced, and the space for the wiring harness manufacturing apparatus can be reduced, thereby reducing the production cost of the wiring harness.

And, the electric wire is colored by the coloring means in a step for assembling the wiring harness. Therefore, the article number (the kind of color of the outer surface) of the electric wire stocked by the wire stocking units can be reduced. Therefore, trouble of controlling the electric wire can be reduced, which could prevent the article number from being mistaken during the assembly of the wiring harness. Therefore, the yield of the wiring harness can be improved.

The invention claimed is:

1. A wiring harness manufacturing method for assembling a wiring harness having electric wires and connectors attached to the electric wires, comprising the steps of:

a wire stocking step to stock the electric wires at a plurality of locations; followed by a cutting-removing-attaching step to cut an electric wire stocked in at least one of said plurality of locations of the wire stocking step in a desirable length, to remove covering portions of end portions of the electric wire, and to attach a terminal fitting of the connector to the electric wire at the respective end portions, wherein, an outer surface of the electric wire is colored at the conclusion of one of the wire stocking step and the cutting-removing-attaching step, said coloring being for the purpose of distinguishing one of: thickness of a core wire of the electric wire; material of a covering portion of the electric wire; and an object of use of the electric wire.

2. A wiring harness manufacturing method for assembling a wiring harness having electric wires and connectors attached to the electric wires, comprising the steps of:

a wire stocking step to stock the electric wires at a plurality of locations; followed by a cutting-removing-attaching step to cut an electric wire stocked in at least one of said plurality of locations of the wire stocking step in a desirable length, to remove covering portions of end portions of the electric wire, and to attach a terminal fitting of the connector to the electric wire at the respective end portions; followed by a joining step at a plurality of locations to connect the electric wires which have been cut in desirable lengths by the cutting-removing-attaching step in at least one of said plurality of locations and to which the respective terminal fittings have been attached, wherein, an outer surface of the electric wire is colored at the conclusion of only one of the wire stocking step, the cutting-removing-attaching step and the joining step, said coloring being for the purpose of distinguishing one of: thickness of a core wire of the electric wire; material of a covering portion of the electric wire; and an object of use of the electric wire.

3. A wiring harness manufacturing apparatus for assembling a wiring harness having electric wires and connectors attached to the electric wires, comprising:

a plurality of wire stocking units each to stock the electric wires; and a plurality of cutting-removing-attaching units each to cut the electric wires stocked in at least one of said plurality of wire stocking units in desirable lengths, to remove covering portions of end portions of the electric wire, and to attach terminal fittings of the connectors to the electric wires at the respective end portions, wherein, a coloring means to color an outer surface of each of the electric wires is attached to one of: the end of only one of the plurality of wire stocking units; and the end of only one of said plurality of cutting-removing-attaching units, said coloring being for the purpose of distinguishing one of: thickness of a core wire of the electric wire; material of a covering portion of the electric wire; and an object of use of the electric wire.

4. A wiring harness manufacturing apparatus for assembling a wiring harness having electric wires and connectors attached to the electric wires, comprising:

a plurality of wire stocking units each to stock the electric wires; and a plurality of cutting-removing-attaching units each to cut the electric wires stocked in at least one of said plurality of wire stocking units in desirable lengths, to remove covering portions of end portions of the electric wire, and to attach terminal fittings of the connectors to the electric wire at the respective end portions; and a plurality of joining units to connect the electric wires which have been cut in desirable lengths by at least one of said plurality of cutting-removing-attaching units and to which the respective terminal fittings have been attached, wherein, a coloring means to color an outer surface of each of the electric wires is attached to one of: the end of only one of said plurality of wire stocking units, to the end of only one of said plurality of cutting-removing-attaching units; and the end of only one of said plurality of joining units, said coloring being for the purpose of distinguishing one of: thickness of a core wire of the electric wire; material of a covering portion of the electric wire; and an object of use of the electric wire.

* * * * *